(12) United States Patent
Krutsch (10) Patent No.: US 10,026,014 B2
(45) Date of Patent: Jul. 17, 2018

(54) METHOD AND APPARATUS FOR DATA SET CLASSIFICATION BASED ON GENERATOR FEATURES

(71) Applicant: FREESCALE SEMICONDUCTOR, INC., Austin, TX (US)

(72) Inventor: Robert Cristian Krutsch, Munich (DE)

(73) Assignee: NXP USA, Inc., Austin, TX (US)

(*) Notice: Subject to any disclaimer, the term of this patent is extended or adjusted under 35 U.S.C. 154(b) by 38 days.

(21) Appl. No.: 15/334,920

(22) Filed: Oct. 26, 2016

(65) Prior Publication Data

US 2018/0114094 A1   Apr. 26, 2018

(51) Int. Cl.
G06K 9/00 (2006.01)
G06K 9/62 (2006.01)

(52) U.S. Cl.
CPC ........ G06K 9/6223 (2013.01); G06K 9/00805 (2013.01); G06K 9/6219 (2013.01); G06K 9/6269 (2013.01); *G06K 9/00* (2013.01)

(58) Field of Classification Search
CPC .... G06F 17/30705; G06F 9/261; G06F 9/265; G06F 9/28; G06F 9/30149; G06F 17/30445; G06F 17/30539; G06F 17/30545; G06F 17/3071; G06K 2209/05; G06K 9/6219; G06K 9/6267; G06K 9/6226; G06K 9/6273; G06K 9/6223; G06K 2209/051; G06K 9/00805; G06K 9/6215; G06K 9/6251; G06K 9/6269; G06K 9/6218; G06T 2207/10072; G06T 2207/30041; G06T 7/0012; G06T 7/008; G06T 7/11; G06T 2207/10056; G06T 2207/20081;

(Continued)

(56) References Cited

U.S. PATENT DOCUMENTS 5,640,468 A * 6/1997 Hsu ................... G06K 9/00201
                                                      382/190
5,917,937 A * 6/1999 Szeliski ................. G06K 9/20
                                                      382/154

(Continued)

OTHER PUBLICATIONS

Rao, R. et al., "Learning Lie Groups for Invariant Visual Perception," Appeal in Advances in Neural Info Processing Systems 11, 1999; downloaded from <<https://homes.cs.washington.edu/~rao/lie.pdf>> on May 6, 2016; 7 pages.

*Primary Examiner* — Aklilu Woldemariam (57) ABSTRACT

A method including receiving, by an image classification engine, a number K of clusters to be created by a clustering algorithm. The method further including receiving, by the image classification engine, a set of elements based on an image, executing, by the image classification engine, the clustering algorithm on the set of elements to create K clusters, each cluster having a respective subset of the set of elements, for each cluster, computing, by the image classification engine, a centroid of the cluster, for each cluster, creating, by the image classification engine, a generator of the cluster based on the respective subset of the set of elements corresponding to each cluster, and for each element of each cluster, computing, by the image classification engine, a cost function corresponding to the element based on the centroid, the respective subset of the set of elements, and the generator corresponding to the cluster.

16 Claims, 4 Drawing Sheets

(58) Field of Classification Search
CPC . G06T 2207/20092; G06T 2207/30004; G06T 2207/30024; G06T 7/0093; G06T 7/136; G06T 7/162; G06T 7/44; G06T 2207/2001; G06T 2210/16; G06T 15/205; G06T 17/10; G06T 17/20; G06T 2207/10028; G06T 17/00; G06T 2207/10012; G06T 2207/30196; G06T 7/12; G06T 2207/10081; G06T 2207/30061; G06T 7/0016; G06T 7/143; G06T 15/00; G06T 19/00; G06T 2207/20016; G06T 2207/20101; G06T 2210/41; G06T 5/002; G06T 7/155; G06T 11/003; G06T 15/08; G06T 19/20; H04L 41/14
USPC ............... 382/104, 128, 133, 154, 173, 298
See application file for complete search history.

(56) References Cited

U.S. PATENT DOCUMENTS

| | | | |
|---|---|---|---|
| 6,591,146 B1* | 7/2003 | Pavlovic | G06K 9/00335 342/102 |
| 6,683,968 B1* | 1/2004 | Pavlovic | G06K 9/00335 342/95 |
| 6,694,044 B1* | 2/2004 | Pavlovic | G05B 17/02 342/95 |
| 6,714,665 B1* | 3/2004 | Hanna | G06K 9/00 382/106 |
| 8,407,164 B2 | 3/2013 | Malik et al. | |
| 9,042,629 B2 | 5/2015 | Qian et al. | |
| 9,240,049 B2* | 1/2016 | Ciurea | H04N 13/232 |
| 2003/0091227 A1* | 5/2003 | Chang | G06T 17/10 382/154 |
| 2004/0029213 A1* | 2/2004 | Callahan | G01N 15/1475 435/40.5 |
| 2005/0152588 A1* | 7/2005 | Yoshida | G06T 7/0012 382/128 |
| 2006/0054782 A1* | 3/2006 | Olsen | H04N 13/214 250/208.1 |
| 2007/0255737 A1* | 11/2007 | Chakrabarti | G06F 17/30705 |
| 2008/0069444 A1* | 3/2008 | Wilensky | G06K 9/38 382/173 |
| 2008/0238919 A1* | 10/2008 | Pack | G06T 15/04 345/420 |
| 2009/0132568 A1 | 5/2009 | Syeda-Mahmood et al. | |
| 2009/0316970 A1* | 12/2009 | Kemper | G06K 9/6223 382/131 |
| 2010/0111370 A1* | 5/2010 | Black | G06K 9/00369 382/111 |
| 2011/0096832 A1* | 4/2011 | Zhang | G06T 7/579 375/240.08 |
| 2011/0216953 A1* | 9/2011 | Callahan | G06K 9/00 382/128 |
| 2011/0229024 A1* | 9/2011 | El-Maraghi | H04N 5/265 382/162 |
| 2011/0234840 A1* | 9/2011 | Klefenz | G06K 9/00375 348/222.1 |
| 2011/0243417 A1* | 10/2011 | Madabhushi | G06K 9/3233 382/131 |
| 2012/0230566 A1* | 9/2012 | Dean | G06T 19/00 382/131 |
| 2013/0071028 A1* | 3/2013 | Schiller | G06T 5/003 382/180 |
| 2013/0216116 A1* | 8/2013 | Yim | G06T 7/0093 382/131 |
| 2013/0346036 A1* | 12/2013 | Borjesson | G06F 17/50 703/2 |
| 2014/0093150 A1* | 4/2014 | Zalev | G06T 7/0012 382/131 |
| 2014/0143407 A1* | 5/2014 | Zhang | H04L 41/145 709/224 |
| 2015/0110377 A1* | 4/2015 | Yim | G06T 7/0093 382/131 |
| 2017/0255840 A1* | 9/2017 | Jean | G06K 9/4671 |

\* cited by examiner

METHOD AND APPARATUS FOR DATA SET CLASSIFICATION BASED ON GENERATOR FEATURES

BACKGROUND

Field of the Disclosure

This disclosure generally relates to a method and apparatus for data set classification based on generator features.

Background of the Disclosure

An automobile advanced driver assistance system operates to identify various safety threats and reduce the risk of traffic incidents. A camera, or other input device, is used to capture information about the automobile's surroundings and transform the information into images that are utilized by the advanced driver assistance system to detect various road users, such as pedestrians, bicycles, motorized two-wheelers, and non-motorized traffic, within the images. The advanced driver information system then attempts to avoid accidents with identified road users. A typical advanced driver assistance system includes a classification algorithm for classifying objects within the images. During operation, the classification algorithm groups a set of elements based on an image into a set of clusters, where a particular cluster includes a respective subset of elements of the image that are more similar to each other than another respective subset of elements of another cluster. The classification algorithm creates the clusters based directly on the elements of the cluster, such as, distance between the elements. The automobile advanced driver assistance system subsequently uses the classified clusters to detect various objects within images. Classifying objects within images in this way can result in a high number of false positive detections and a high probability of misdetection of the objects within the images.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

An embodiment of an advanced driver assistance system is disclosed that includes a data acquisition device that acquires information to be processed by the advanced driver assistance system. The advanced driver assistance system includes a data processor and an image classification engine. During operation, the data acquisition device communicates information to the data processor, where the information is transformed into an image. The image classification engine parses the image to search for objects within the image, such as pedestrians. This is accomplished by identifying features in the image for subsequent use by an active system for object detection, where these features are computed and/or learned based on the image.

According to an embodiment, this is accomplished by the image classification engine receiving a set of elements based on the image, and a number K that indicates a number of clusters to be created from the elements by a clustering algorithm. The image classification engine executes the clustering algorithm on the set of elements to create K clusters, each cluster having a respective subset of the set of elements. Next, the image classification engine executes, for each cluster of the K clusters, a classifier algorithm to compute a centroid of the cluster. The classifier algorithm then creates, for each cluster, a generator of the cluster based on the respective subset of the set of elements corresponding to each cluster, and for each element of each cluster, computes a cost function corresponding to the element based on the centroid, the respective subset of the set of elements, and the generator corresponding to the cluster. In response to determining that each cost function corresponding to each element of the cluster is less than or equal to a cost function threshold, the classifier algorithm computes a feature based on each cost function corresponding to each element of the cluster. The features identified in the image can subsequently be used by Classifying images based on generator features in this manner can result in a reduction in false positive detections and a lower probability of misdetection of objects within the images and, as such, can improve the identification of road users and improved accident avoidance.

Figure 1:
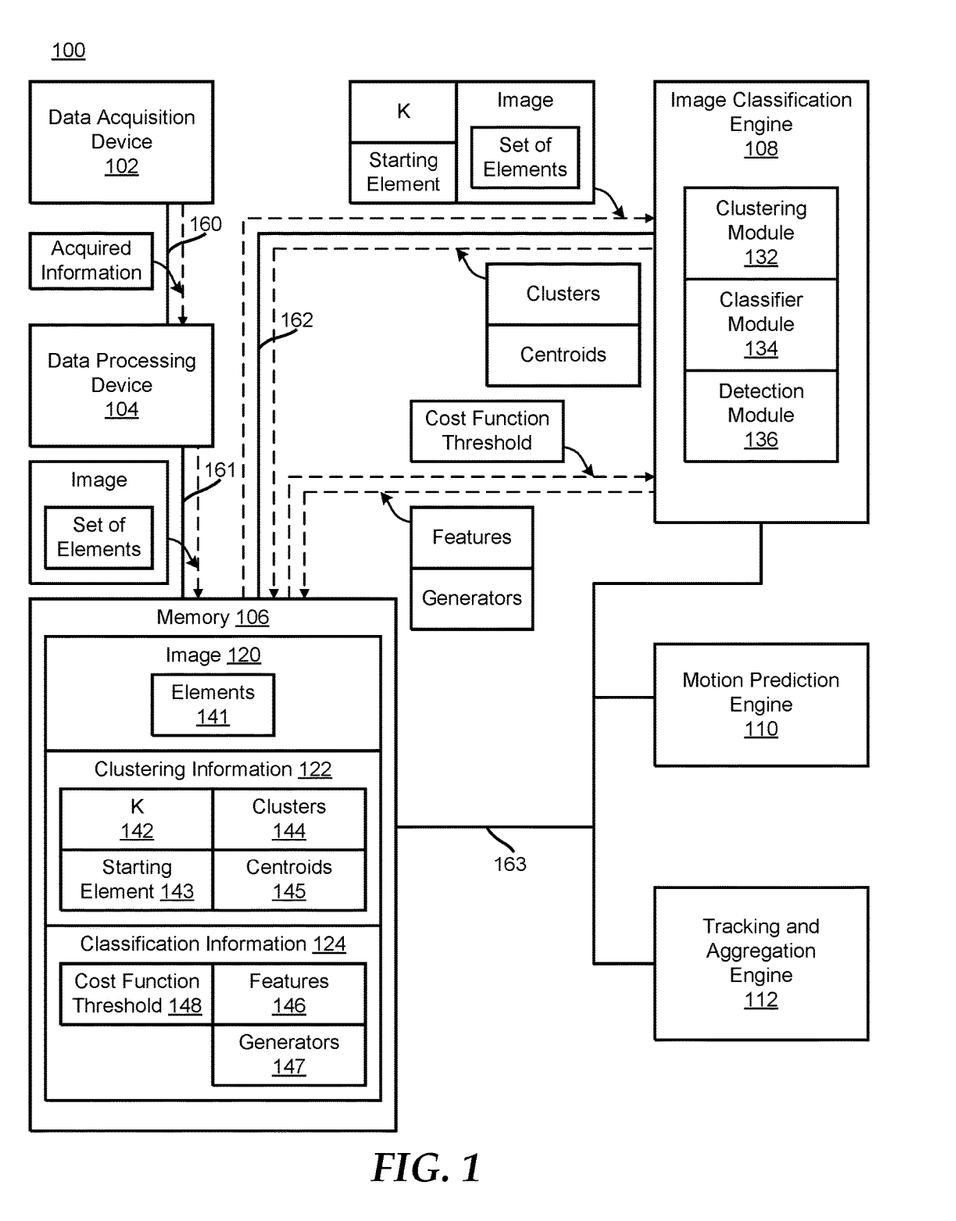
FIG. 1 is a block diagram illustrating an advanced driver assistance system, in accordance with at least one embodiment of the present disclosure.

FIG. 1 illustrates an advanced driver assistance system 100 in accordance with a specific embodiment. Advanced driver assistance system 100 includes a data acquisition device 102 that acquires information utilized by the system. Examples of a data acquisition device include a camera, a radar system, a data base, and the like, which can communicate video, data, and the like with an advanced driver assistance system.

The information acquired by the data acquisition device can be used by the advanced driver assistance system to allow the detection of hazards, including vulnerable road users, such as pedestrians, bicycles, motorized two-wheelers, and non-motorized traffic, and to avoid accidents with these hazards. Data acquisition device 102 transmits the acquired information, for example a camera's RAW Bayer pattern, via an interconnect 160 to a data processing device 104 that transforms the acquired information into a dataset that is stored at a storage location of memory 106 via an interconnect 161. The dataset can include a vector of measurements, a set of points in a multidimensional space, an image, and the like. In an exemplary embodiment, the dataset can be an image, which is stored at a storage location image 120 of memory 106 via the interconnect 161 and a set of elements based on the image, which is stored at a storage location elements 141 of memory 106.

An image classification engine 108 receives the image via interconnect 162, parses the image to search for and detect objects within the image, such as pedestrians, and labels the detected objects of the image. Image classification engine 108 identifies features in the image for subsequent use by an active system, where these features are computed or learned based on the image as described in further detail below.

Image classification engine 108 includes a clustering module 132 for clustering the set of elements based on the image into a number of clusters K, which are stored at a storage location clusters 144 of memory 106. In an embodiment, the set of elements can be based on a portion of the image. The number K can be stored at a storage location K 142 of a storage location clustering information 122 or a storage location of image classification engine 108. Thus, clustering module 132 receives the number K, indicating the number of clusters to be created, the image, and the set of elements based on the image, and performs a clustering analysis on the set of elements to create the K clusters, where each cluster has a respective subset of the set of elements based on the image. The task of the clustering analysis is to further identify a respective subset of the set of elements that belong to a specific cluster by virtue of being more similar to each other than to other respective subsets of the set of elements of other clusters. In another embodiment, clustering module 132 also receives a starting element, indicating the element of the set of elements that should be used at the start of the clustering analysis. The starting element can be stored at a storage location starting element 143 of the storage location clustering information 122, or a storage location of image classification engine 108.

The clustering analysis can create the K clusters based on a defined distance, which is typically relatively small, among the respective subset of the set of elements of a specific cluster, density of image characteristics of the set of elements, the intervals or particular statistical distributions of characteristics of the set of elements of the image, and the like. Thus, the clustering analysis utilizes an appropriate clustering algorithm and parameter settings, including the distances function to use, a density threshold, the number of expected clusters, which itself can depend on the specific image, and intended use of the results, and the like. Clustering analysis can be an iterative process of knowledge discovery or interactive multi-objective optimization that involves trial and error to achieve the desired results. The clustering algorithm can be a hierarchical clustering algorithm based on distance connectivity, a centroid based algorithm, a k-means clustering algorithm, an expectation maximization algorithm based on statistical distributions, a dense model algorithm based on connected dense regions in the image, a bi-clustering algorithm, a grouping algorithm, a Lloyd's clustering algorithm, and the like.

In an exemplary embodiment, the clustering algorithm can be a centroid-based clustering algorithm, e.g., the k-means clustering algorithm that represents each cluster of the K clusters by a central vector, which may not be a member of a respective subset of the set of elements of each cluster. The number of clusters K and a starting element of the set of elements of the image can be provided to the clustering algorithm at the beginning of the algorithm. The clustering algorithm finds a respective centroid for each one of K clusters, and assigns a respective subset of the set of elements of the image to the cluster having the nearest centroid, such that the summation of the squared distances between each element of the respective subset of the set of elements and the nearest centroid are minimized as represented by the function:

$$\text{Sum}(\text{Distance}(I_1,I0)^2+\text{Distance}(I_2,I0)^2+ \ldots + \text{Distance}(I_N,I0)^2)$$

where $I_1$, $I_2$, and $I_N$ are the N elements of the respective subset of the set of elements of the image assigned to the cluster, $I0$ is the centroid of the cluster, $\text{Distance}(I_j, I0)^2$ computes the squared distance between the jth element of the respective subset of the set of elements, and $\text{Sum}(\ldots)$ computes the summation of all of the squared distances. Thus, clustering module 132 creates K clusters, where each cluster includes the respective subset of the set of elements of the cluster, and stores the K clusters associated with the image and the clustering information associated with the K clusters at memory 106, where the clustering information of the K clusters includes the respective subset of the set of elements of the image assigned to each of the K clusters.

A classifier module 134 of image classification engine 108 receives the K clusters and the associated clustering information, and executes a classifier algorithm to compute the centroid of each of the K clusters, which are stored at a storage location centroids 145 of a storage location classification information 124 of memory 106. The centroid can be computed based on color values of pixels associated with each element of the respective subset of the set of elements assigned to each of the K clusters and/or based on position values of each element within the image. The centroid can be a simple average, a center of mass, or values learned from data associated with each element.

Next, the classifier algorithm of classifier module 134 creates, for each cluster of the K clusters, a generator associated with the cluster based on the respective subset of the set of elements corresponding to the cluster, where the generator corresponds to a multidimensional generator matrix, a tensor.

The multidimensional generator matrix contains characteristics of a portion of a particular object, e.g. part of a head of a pedestrian, where the characteristics are learned from data associated with each element of the respective subset of the set of elements. The characteristics of a portion of a particular object can be pixel values, e.g. color values, relationships amongst a plurality of pixel values, position values of each element within the image, dimension values of the corresponding cluster, e.g. height, width, and depth, and the like. The classifier algorithm of classifier module 134 stores the generator at a storage location generators 147 of memory 106.

Next, the classifier algorithm of classifier module 134 calculates, for each element of each cluster of the K clusters, a cost function associated with the element based on the centroid, the respective subset of the set of elements, and the generator corresponding to the cluster, where the cost function is minimized. In an exemplary embodiment, the cost function associated with the element is represented by:

$$Abs(I_j-I0*\text{Exp}(I_jG))$$

where $I_j$ is the jth element of the N elements of the respective subset of the set of elements assigned to the cluster, $I0$ is the centroid of the cluster, $G$ is the multidimensional generator matrix corresponding to the generator, $\text{Exp}(I_jG)$ computes the matrix exponential of $I_j$ and $G$, and $Abs(\ldots)$ computes the matrix absolute value of $(I_j-I0*\text{Exp}(I_jG))$.

The classifier algorithm of classifier module 134 determines whether the cost function associated with the jth element exceeds a cost function threshold that is stored at a storage location cost function threshold 148 of memory 106. When the cost function associated with the jth element exceeds the cost function threshold, the jth element does not belong to the cluster. In this case, the classifier algorithm of classifier module 134 can increase the number K of clusters to be created and/or change the starting element of the set of elements of the image and repeat the clustering analysis performed by clustering module 132 as described above. When the cost function associated with the jth element is less than or equal to the cost function threshold, the jth element belongs to the cluster and the cost function associated with the jth element is minimized.

Next, the classifier algorithm of classifier module 134 creates, for each cluster of the K clusters, a feature associated with the cluster based on the cost functions associated with the N elements corresponding to the cluster, and stores the feature at storage location features 146 of a storage location classification information 122 of memory 106. In an exemplary embodiment, the feature associated with the cluster is represented by the function:

$$\text{Sum}(Abs(I_1-I0*\text{Exp}(I_1G))\ldots+Abs(I_j-I0*\text{Exp}(I_jG))\ldots+Abs(I_N-I0*\text{Exp}(I_NG)))^2$$

where $I_1$, $I_j$, and $I_N$ are the N elements of the respective subset of the set of elements assigned to the cluster, I0, G, Exp( . . . ) and Abs( . . . ) are as described above, and Sum( ) calculates the square of the matrix summation of each cost function of the N cost functions corresponding to the cluster. The feature is a learned number that describes the cluster, is an approximation of an exponential function that best fits the N elements of the corresponding cluster, and best approximates the hypersurface of the cluster. In an embodiment, a feature, a feature layer, can be constructed on top of one or more already existing features, feature layers, using the functions described above.

The features associated with the K clusters of the image can be part of a training data set that is use to train the classifier. The training data set can be completed and the classifier can be trained based on classifying multiple images as previously described, where classifying the multiple images results in a learned set of features associated with each image of the multiple images. The training data set and the trained classifier can then be used in an active system to compute the learned set of features on new data. Then, the active system determines if a computed feature associated with a new cluster of the new data is likely to be part of a cluster associated with a feature in the learned set of features associated with each image of the multiple images based on the trained classifier. Classifying images based on generator features in the manner described above results in reductions of the miss rate, misclassification of the image, and the number of false positives in the classification of the image.

A detection module 136 of image classification engine 108 receives a new image, computes a learned set of features on the new image, and detects objects, such as pedestrians, in the new image.

A motion prediction engine 112 receives new images and processes the new images to generate motion information including the relative motion and ego motion of the detected objects within the new images, which is provided to a tracking and aggregation engine 112.

Tracking and aggregation engine 112 receives the new images and the motion information, generates frame to frame tracking information, and aggregates the tracking and motion information associated with the new images.

Figure 2:
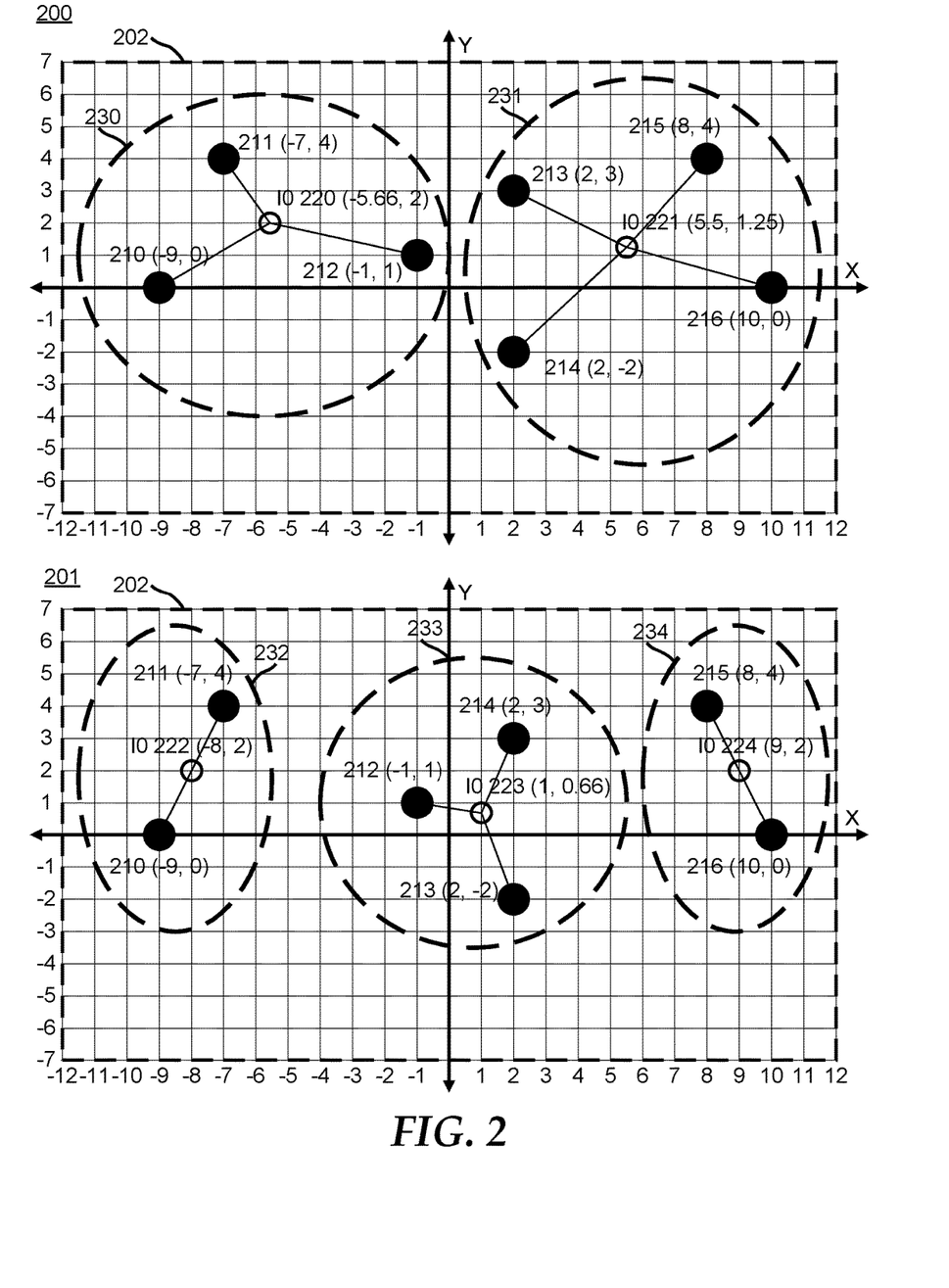
FIG. 2 illustrate a pair of results of performing a classification process on a set of elements based on a two dimensional image, one for an initial classification process that does not successfully classify the image, the other for a subsequent classification process that successfully classifies the image, in accordance with at least one embodiment of the present disclosure.

FIG. 2 illustrates an exemplary pair of results 200 and 201 of performing an exemplary classification on a set of elements 210-216 based on a two dimensional image 202, one for an initial classification that does not successfully classify the image 202, the other for a subsequent classification that successfully classifies the image 202. The set of elements 210-216 have X, Y coordinates of (−9, 0), (−7, 4), (−1, 1), (2, 3), (2, −2), (8, 4), and (10, 0), respectively.

The results 200 of performing the initial classification on image 202 show the two (K) clusters 230 and 231 created by the clustering algorithm of clustering module 132, where cluster 230 has a respective subset of the set of elements 210-216, and cluster 231 has the respective subset of the set of elements 210-216. Cluster 230 has a centroid (I0) 220 with X, Y coordinates of (−5.66, 1.67) and cluster 231 has a centroid 221 with X, Y coordinates of (5.5, 1.25) computed by clustering module 132. The centroid can be calculated as the average of the X and Y coordinates of the respective subset of the set of elements as shown below:

For centroid 220, $X=(-7-9-1)/3=-5.66$ and $Y=(0+4+1)/3=1.67$.

For centroid 221, $X=(2+2+8+10)/4=5.5$ and $Y=(3-2+4+0)/4=1.25$.

After classifier module 134 created, for each cluster 230 and 231, a generator of the cluster based on the respective subset of the set of elements corresponding to the cluster, calculated, for each element of each cluster, a cost function based on the centroid, an element of the respective subset of the set of elements corresponding to the cluster, and the generator of the cluster, and determined, for each element of each cluster, whether the cost function associated with the element exceeded a cost function threshold. When classifier module 134 determined that the cost function exceeded the cost function threshold, the number K of clusters to be created during the clustering algorithm was increased to three and a subsequent classification was run. When classifier module 134 subsequently determined that the cost function was less than or equal to the cost function threshold that indicated that the cost function had been minimized, classifier module 134 created, for each cluster, a feature of the cluster based on the cost function associated with the cluster.

The results 201 of performing the subsequent classification on image 202 show the three (K) clusters 232-234 created by clustering module 132, where cluster 232 has a respective subset of the set of elements 210-216 including elements 210 and 211, cluster 233 has a respective subset of the set of elements 210-216 including elements 212-214, and cluster 234 has the respective subset of the set of elements 210-216 including elements 215 and 216. Cluster 232 has a centroid 222 with X, Y coordinates of (−8, 2), cluster 233 has a centroid 223 with X, Y coordinates of (1, 0.67) and cluster 234 has a centroid 224 with X, Y coordinates of (9, 2) computed by clustering module 132 of the classification process. The centroid calculations are shown below:

For centroid 222, $X=(-7-9)/2=-8$ and $Y=(0+4)/2=2$.

For centroid 223, $X=(|1+2+2)/3=1$ and $Y=(1-2+3)/3=0.67$.

For centroid 224, $X=(8+10)/2=9$ and $Y=(4+0)/2=2$.

After classifier module 134 created, for each cluster 232-234, the feature of the cluster, the subsequent classification was successfully completed.

Figure 3:
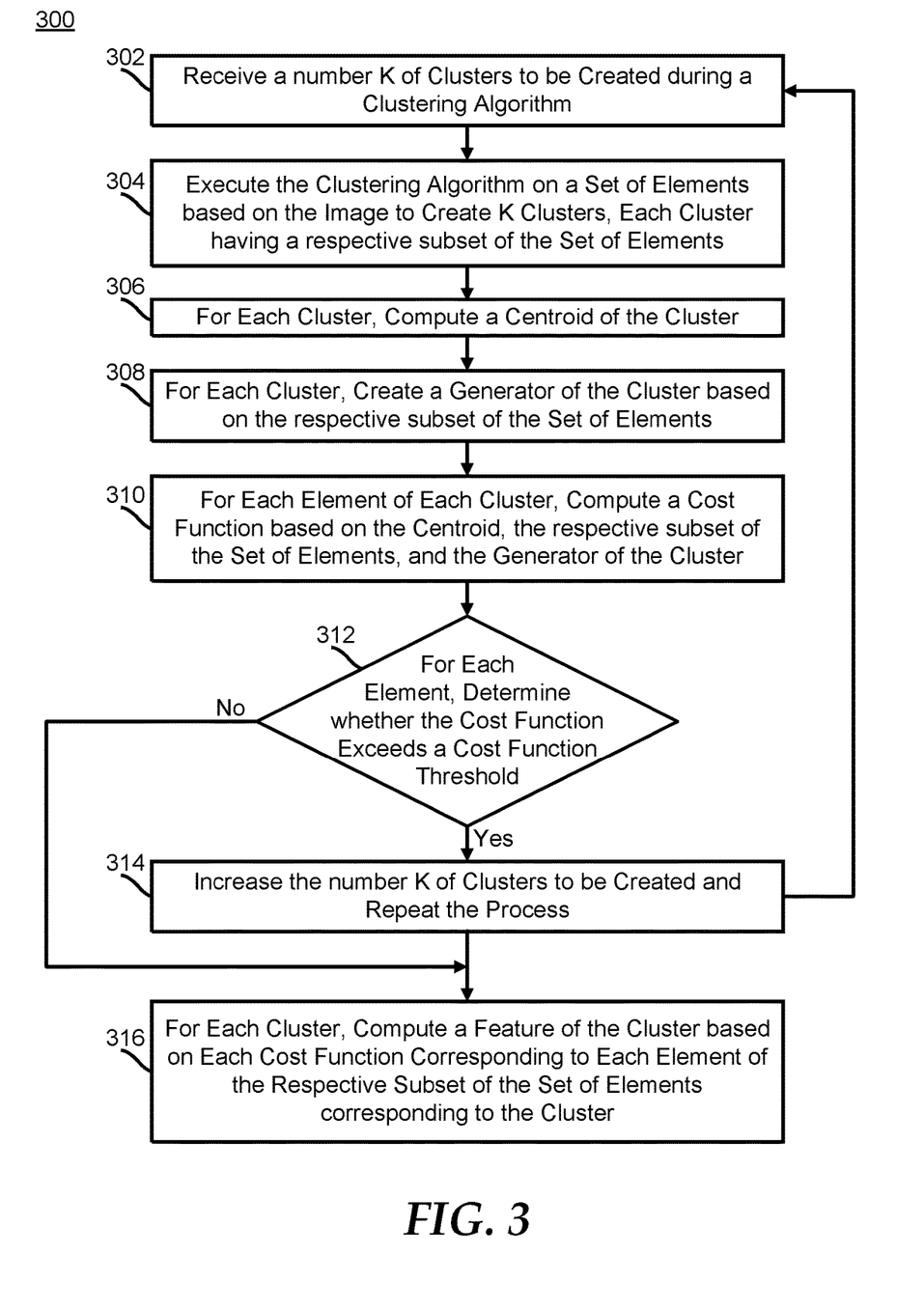
FIG. 3 illustrates a method 300 of image classification based on generator features, in accordance with at least one embodiment of the present disclosure.

FIG. 3 illustrates a method of image classification based on generator features 300, where the exemplary method 300 begins at block 302. At block 302, a clustering module receives a set of elements based on an image and a number K of clusters to be created during a clustering algorithm of the clustering module.

At block 304, the clustering module executes the clustering algorithm on the set of elements based on the image to create K clusters, each cluster having a respective subset of the set of elements. At block 306, a classifier module computes, for each cluster, a centroid of the cluster based on the cluster and associated clustering information. At block 308, the classifier module creates, for each cluster, a generator associated with the cluster based on the respective subset of the set of elements corresponding to the cluster, where the generator corresponds to a multidimensional generator matrix. At block 310, the classifier module calculates, for each element of each cluster of the K clusters, a cost function associated with the element based on the centroid, the respective subset of the set of elements, and the generator corresponding to the cluster, where the cost function is minimized.

At block 312, the classifier module determines, for each element of each cluster of the K clusters, whether the cost function associated with the element exceeds a cost function threshold. When the cost function associated with the element exceeds the cost function threshold, the element does not belong to the cluster and the method proceeds to block 314. Otherwise, when the cost function associated with the element is less than or equal to the cost function threshold, the element belongs to the cluster, the cost function associated with the element is minimized, and the method proceeds to block 316. At block 314, the classifier module increases the number K of clusters to be created during the clustering algorithm and proceeds to block 302 to repeat the image classification. At block 316, the classifier module creates, for each cluster of the K clusters, a feature associated with the cluster based on each cost function associated with each element corresponding to the cluster. Once each feature associated with each cluster has been created, the image classification successfully completes.

Figure 4:
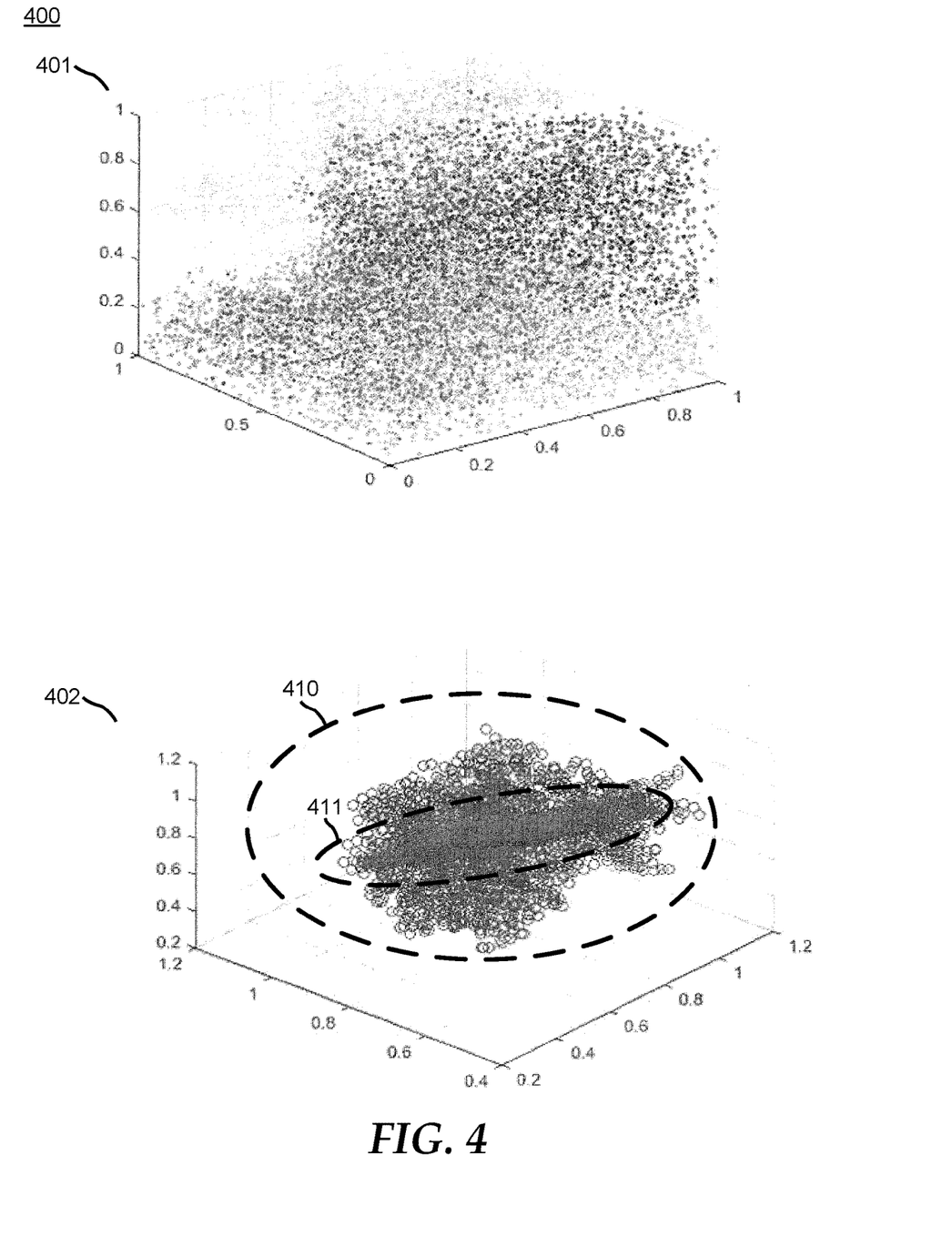
FIG. 4 illustrates classification results of two different Support Vector Machine (SVM) classifiers trained to classify data, in accordance with at least one embodiment of the present disclosure.

FIG. 4 illustrates an exemplary dataset of elements 401 and classification results 402 of two different Support Vector Machine (SVM) classifiers trained to classify the dataset of elements 401. The exemplary dataset of elements 401 is a random three dimensional dataset of 20,000 elements labeled 0 and 1. 15,000 elements of the dataset of elements 401 are clustered into 8 clusters and the remaining 5,000 elements of the dataset of elements 401 are used to verify the classification results. A first SVM classifier classifies each cluster of the 8 clusters having a respective subset of the 15,000 elements of the dataset of elements 401 based directly on the respective subset of the 15,000 elements corresponding to each cluster of the 8 clusters. The results of the first SVM classifier are shown in classification results 402 contained within the dashed eclipse 410. A second SVM classifier classifies each cluster of the 8 clusters having the respective subset of the 15,000 elements of the dataset of elements 401 based on the generator feature of the corresponding cluster of the 8 clusters as previously described. The results of the second SVM classifier are shown in classification results 402 contained within the dashed eclipse 411.

An exemplary classifier results table 1, shows additional detail of the classification results 402 of FIG. 4 for the first and second SVM classifiers provided below:

| Classifier results table 1 for classification results 402 | | |
| --- | --- | --- |
| Classifier | Miss rate (in 20K set) | False Positive (in 20K set) |
| First SVM classifier-direct | 2380 | 2377 |
| Second SVM classifier-Generator Features | 1238 | 1355 |

The above exemplary classifier results table 1 shows the miss rate and the false positives in the 20,000 elements of the dataset of elements 401 for both of the SVM classifiers, where row 1 includes a miss rate of 2,380 and false positives of 2,377 for the first SVM classifier based directly on the data, and row 2 includes a miss rate of 1,238 and false positives of 1,355 for the second SVM classifier based on generator features. The miss rate and false positives of the second SVM classifier based on generator features are reduced by almost half the miss rate and almost 9/16 the false positives of the first SVM classifier based directly on the respective subset of the elements, respectively.

It will be appreciated that the devices disclosed herein can be implemented in various manners using various types of memory.

The interconnects disclosed herein are used to communicate information between various modules and devices either directly or indirectly. For example, each of the interconnects can be implemented as a passive device, such as conductive nodes that include one or more conductive traces, that transmits directly between the various modules and devices, or as an active device, where information being transmitted is buffered, for example stored and retrieved, in the process of being communicated between devices, such as at a first-in first-out memory or other memory device. In addition, a label associated with an interconnect can be used herein to refer to a signal and information transmitted by the interconnect.

Data processing device 104, image classification engine 108, motion prediction engine 110, and tracking and aggregation engine 112, can be provided by, for example, one or more of an instruction based data processor and associated memory devices that store instructions executed, a non-instruction based state machine, an instruction based digital signal processor, an application specific integrated circuit device, a field programmable gate array (FPGA), a General Purpose Processor (GPP), another type of logic circuit capable of performing operations, the like, and combinations thereof.

In the foregoing specification, the invention has been described with reference to specific examples of embodiments of the invention. It will, however, be evident that various modifications and changes may be made therein without departing from the broader scope of the invention as set forth in the appended claims, and that the claims are not limited to the specific examples described.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   receiving, by a circuit including an image classification engine, a number K of clusters to be created by a clustering algorithm;
   receiving, by the circuit including the image classification engine, a set of elements based on an image;
   executing, by the circuit including the image classification engine, the clustering algorithm on the set of elements to create K clusters, each cluster having a respective subset of the set of elements;
   for each cluster, computing, by the circuit including the image classification engine, a centroid of the cluster, wherein computing the centroid of the cluster is based on one or more of a value selected from a group consisting of color values of pixels associated with each element of the respective subset of the set of elements of the cluster, position values of each element of the cluster within the image, a simple average of values associated with each element of the cluster, a center of mass of the respective subset of the set of elements of the cluster, and values learned from data associated with each element of the cluster;
   for each cluster, creating, by the circuit including the image classification engine, a generator of the cluster based on the respective subset of the set of elements corresponding to each cluster; and
   for each element of each cluster, computing, by the circuit including the image classification engine, a cost function corresponding to the element based on the centroid, the respective subset of the set of elements, and the generator corresponding to the cluster, wherein the cost function corresponding to the element is computed by:

$$Abs(I-I0*Exp(IG)),$$

wherein I is the element, I0 is the centroid of the cluster, G is a multidimensional generator matrix corresponding to the generator, Exp( ) is a matrix exponential function, and Abs( ) is a matrix absolute value function.

2. The method of claim 1, further comprising:
   computing, for each cluster of the K clusters, a feature based on each cost function corresponding to each element of the respective subset of the set of elements corresponding to the cluster.

3. The method of claim 1, further comprising:
   for each cost function corresponding to each element of the respective subset of the set of elements corresponding to each cluster, in response to determining that the cost function exceeds a cost function threshold, increasing the number K of clusters to be created by the clustering algorithm and repeat the method.

4. The method of claim 1, wherein the feature corresponding to the cluster is computed by:

$$Sum(\text{cost-function}_1 + \ldots + \text{cost-function}_N)^2,$$

wherein cost-function$_1$, and cost-function$_N$ are the $1^{st}$ and the $N^{th}$ cost functions corresponding to the $1^{st}$ and the $N^{th}$ elements of the N elements of the cluster, and Sum( )$^2$ is a matrix squared summation function that squares the sum of the N cost functions corresponding to the N elements of the cluster.

5. The method of claim 1, further comprising:
   receiving, by the circuit including the image classification engine, a starting element indicating the element of the set of elements to be used at the start of the clustering algorithm.

6. The method of claim 1, wherein the generator of an associated cluster corresponds to a multidimensional generator matrix comprising characteristics learned from data associated with each element of the respective subset of the set of elements of the cluster including one or more of pixel values associated with the element, relationship values amongst the respective subset of the set of elements of the cluster, position values of the element within the image, and dimension values of the corresponding cluster.

7. The method of claim 1, wherein the clustering algorithm is one or more of a centroid based clustering algorithm, a k-means clustering algorithm, a hierarchical clustering algorithm, an expectation maximization algorithm, a dense model algorithm, a bi-clustering algorithm, a grouping algorithm, and a Lloyd's clustering algorithm.

8. A circuit including an image classification engine, the image classification engine comprising:
   a clustering module, and a classifier module,
   the circuit including the image classification engine to:
   receive a number K of clusters to be created by a clustering algorithm of the clustering module;
   receive a set of elements based on an image;
   execute the clustering algorithm on the set of elements to create K clusters, each cluster having a respective subset of the set of elements;
   for each cluster, execute a classifier algorithm of the classifier module to compute a centroid of the cluster, wherein computing the centroid of the cluster is based on one or more of a value selected from a group consisting of color values of pixels associated with each element of the respective subset of the set of elements of the cluster, position values of each element of the cluster within the image, a simple average of values associated with each element of the cluster, a center of mass of the respective subset of the set of elements of the cluster, and values learned from data associated with each element of the cluster;
   for each cluster, execute the classifier algorithm to create a generator of the cluster based on the respective subset of the set of elements corresponding to each cluster; and
   for each element of each cluster, execute the classifier algorithm to compute a cost function corresponding to the element based on the centroid, the respective subset of the set of elements, and the generator corresponding to the cluster, wherein the cost function corresponding to the element is computed by:

$$Abs(I-I0*Exp(IG)),$$

wherein I is the element, I0 is the centroid of the cluster, G is a multidimensional generator matrix corresponding to the generator, Exp( ) is a matrix exponential function, and Abs( ) is a matrix absolute value function.

9. The circuit including the image classification engine of claim 8, further to:
   for each cluster of the K clusters, execute the classifier algorithm to compute a feature based on each cost function corresponding to each element of the respective subset of the set of elements corresponding to the cluster.

10. The circuit including the image classification engine of claim 8, further to:
for each cost function corresponding to each element of the respective subset of the set of elements corresponding to each cluster, in response to determining that the cost function exceeds a cost function threshold, execute the classifier algorithm to increase the number K of clusters to be created by the clustering algorithm and repeat the execution of the clustering algorithm.

11. The circuit including the classification engine of claim 8, wherein the feature corresponding to the cluster is computed by:

$$\mathrm{Sum}(\text{cost-function}_1 + \ldots + \text{cost-function}_N)^2,$$

wherein cost-function$_1$, and cost-function$_N$ are the $1^{st}$ and the $N^{th}$ cost functions corresponding to the $1^{st}$ and the $N^{th}$ elements of the N elements of the cluster, and Sum( )$^2$ is a matrix squared summation function that squares the sum of the N cost functions corresponding to the N elements of the cluster.

12. The circuit including the image classification engine of claim 8, further to:
receive a starting element indicating the element of the set of elements to be used at the start of the clustering algorithm.

13. A method comprising:
executing, by a circuit including an image classification engine, a clustering algorithm on a set of elements based on an image to create a number K clusters, each cluster having a respective subset of the set of elements;
for each cluster, computing, by the circuit including the image classification engine, a centroid of the cluster, wherein computing the centroid of the cluster is based on one or more of a value selected from a group consisting of color values of pixels associated with each element of the respective subset of the set of elements of the cluster, position values of each element of the cluster within the image, a simple average of values associated with each element of the cluster, a center of mass of the respective subset of the set of elements of the cluster, and values learned from data associated with each element of the cluster;
for each cluster, creating, by the circuit including the image classification engine, a generator of the cluster based on the respective subset of the set of elements corresponding to each cluster;
for each element of each cluster, computing, by the circuit including the image classification engine, a cost function corresponding to the element based on the centroid, the respective subset of the set of elements, and the generator corresponding to the cluster; and
computing, for each cluster of the K clusters, a feature based on each cost function corresponding to each element of the respective subset of the set of elements corresponding to the cluster, wherein the cost function corresponding to the element is computed by:

$$Abs(I - I0 * \mathrm{Exp}(IG)),$$

wherein I is the element, I0 is the centroid of the cluster, G is a multidimensional generator matrix corresponding to the generator, Exp( ) is a matrix exponential function, and Abs( ) is a matrix absolute value function.

14. The method of claim 13, further comprising:
for each cost function corresponding to each element of the respective subset of the set of elements corresponding to each cluster, in response to determining that the cost function exceeds a cost function threshold, increasing the number K of clusters to be created by the clustering algorithm and repeat the method.

15. The method of claim 13, wherein the feature corresponding to the cluster is computed by:

$$\mathrm{Sum}(\text{cost-function}_1 + \ldots + \text{cost-function}_N)^2,$$

wherein cost-function$_1$, and cost-function$_N$ are the $1^{st}$ and the $N^{th}$ cost functions corresponding to the $1^{st}$ and the $N^{th}$ elements of the N elements of the cluster, and Sum( )$^2$ is a matrix squared summation function that squares the sum of the N cost functions corresponding to the N elements of the cluster.

16. The method of claim 1, wherein executing the clustering algorithm is further based on a starting element indicating the element of the set of elements to be used at the start of the clustering algorithm.

\* \* \* \* \*